June 25, 1935.  F. W. DENNISON  2,005,937
DETACHABLE GATE
Filed May 11, 1933

Witness
R. B. Davison

Inventor
Forrest W. Dennison
By Ira J. Wilson
Atty

Patented June 25, 1935

2,005,937

UNITED STATES PATENT OFFICE 2,005,937

DETACHABLE GATE

Forrest W. Dennison, Beloit, Wis., assignor to Taylor Freezer Corporation, Beloit, Wis., a corporation of Delaware Application May 11, 1933, Serial No. 670,434

3 Claims. (Cl. 251—19)

This invention pertains in general to detachable gates or passage closure members and in particular to gates for regulating and closing the cream discharge spouts of ice cream freezers. It will be observed that the features and advantages of the invention will be suitable for use in various kinds of apparatus other than are mentioned in this specification.

This type of gate and its detachability are especially useful when employed to control the cream discharge spouts of ice cream freezers. In such a case the spout may be provided with a rather broad opening which terminates abruptly at a plane surface, and when the detachable gate is removed, the interior of the spout as well as its terminus are then easily accessible for scrupulous cleaning, and the gate itself then detached may be cleaned and sterilized separately from the rest of the freezer. Yet the construction which makes it possible to very quickly and easily attach or detach the gate is so simple to use that the operator will never be deterred from detaching the gate for cleaning purposes.

Accordingly one of the objects of the invention is to provide a detachable gate for a spout, the end of the spout and one face of the gate both preferably being plane surfaces which may be accurately machined conveniently for a tight fit.

Another object of this invention is to provide a gate for a spout which may be conveniently attached or detached.

Other objects and advantages of the invention should become apparent upon a perusal of this specification.

Figure 1:
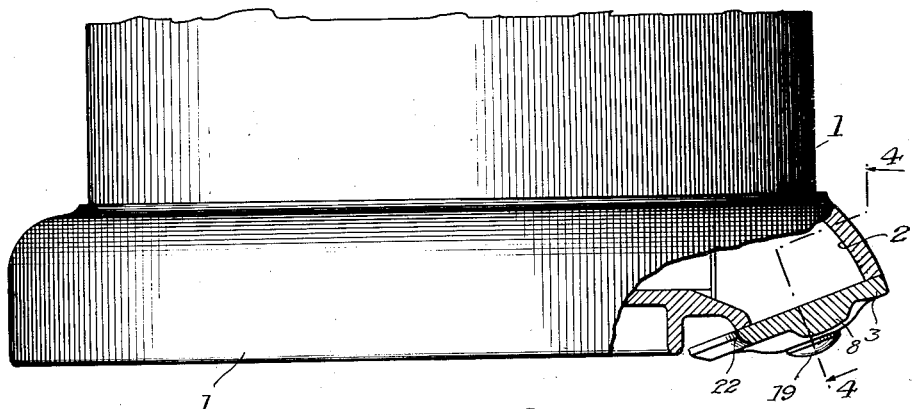
Figure 2:
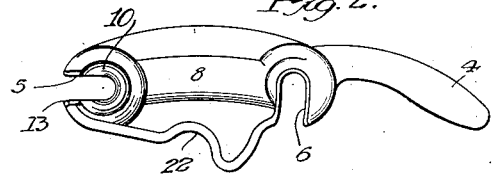
Figure 3:
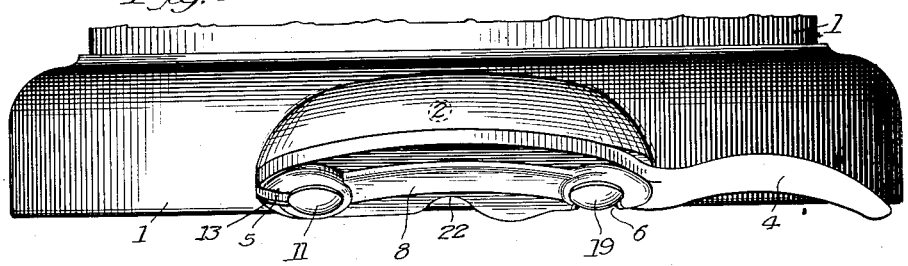
Figure 4:
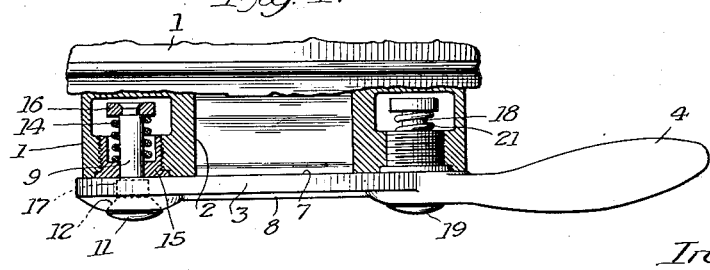

Fig. 1 of the drawing is a side elevation of the bottom portion of a vertical freezer showing in section a portion of the discharge spout and the gate as constructed in accordance with this invention, Fig. 2 is a plan view of the gate itself, on a reduced scale, Fig. 3 is a front elevation of the bottom portion of the freezer shown in Fig. 1, and Fig. 4 is a view partially in section on the line 4—4 of Fig. 1.

Referring now to the drawing, the shell 1 of the freezer is provided with a spout 2 for discharging cream from the bottom of the freezer. The spout terminates in edges which are preferably machined to form a plane surface across which an equally flat and accurately machined gate, generally indicated as 3, may be rotated.

The gate is provided with a handle 4 and a pivotal slot 5, together with a locking slot 6. One face 7 of the gate is machined flat to slide snugly over the terminus of the spout, while the opposite face is provided with a reinforcing rib 8. The corresponding machined faces of the spout and gate will thus easily provide a watertight joint.

The pivot about which the gate swings is a bolt 9 provided with a head 11, the underface 12 of which is beveled as indicated to cooperate with the beveled edge 13 of the slot 5 so that the gate may be slid into pivotal position readily, causing the bolt 9 to move outwardly against the force of the compression spring 14. This spring abuts against the hollow interior of the threaded collar 15 and at its opposite end against a washer 16 which may be locked in any suitable manner, as by a rivet or screw, to the inner end of the bolt. A circumferential shoulder 17 is provided on the bolt head to bear against the margins of the hole through the collar 15 to thus limit the inward movement of the bolt when the gate has been withdrawn entirely, and at the same time assist in sealing the bolt hole against any inadvertent entrance of foreign matter.

A similar bolt 18 slidably and resiliently mounted in the shell of the freezer adjacent the spout is provided for engagement with the slot 6 of the gate when the latter is rotated to closed and locked position. The inner face of the bolt head 19 is beveled similarly to the bolt face 12 to cooperate with the beveled edges of the slot 6 so that when the gate is rotated to closed position the bolt will be urged outwardly against the action of its spring 21. In closed position of the gate the two resiliently mounted bolts lock the gate snugly against the machined face of the spout.

Since the slot 6 opens downwardly the gate is opened by lifting the handle, and when the gate has been partially opened the indentation 22 in its lower edge will first provide a small aperture at the lower edge of the spout through which a small controlled stream of cream may be allowed to flow, as would be desired where the cream is to be flowed directly into cups, small boxes or ice cream cones. Further lifting of the gate handle will, of course, open the spout wide to permit the full flow of the cream. It should be understood that the shape and proportions of the pivot pin 9 and the enlarged recess 10 at the inner end of the slot 5 and the force of the spring 14 are sufficient to retain the gate in pivotal relation with the freezer even when wide open and will assist in causing the gate to remain wide open without further attention from the operator. When the operator desires to disengage the gate from the freezer, he rotates it first to wide open position and then by pulling the handle disengages the slot 5 from the bolt 9.

When the gate is removed all of its surfaces can very conveniently be washed and sterilized and itself restored to position by merely inserting the slot 5 under the head of the bolt 9 pushing it to its seat and then rotating the gate downwardly to lock the slot 6 under the bolt head 19.

It should be understood that the invention is susceptible of being constructed in various modified forms without departing from the spirit and scope of the invention as defined in the appended claims.

Having shown and described my invention, I claim:

1. In combination with a spout having a port, a pair of spring loaded studs positioned at opposite sides of the port secured to the spout and having enlarged heads, and a gate having a handle protruding from one end thereof provided with a slot in the opposite end of the gate opening away from said handle and extending generally parallel thereto, said gate having a second slot at its end adjacent the handle extending perpendicularly to the first slot, the first slot being slidably engageable under the head of one stud for establishing pivoting of the gate thereon and the second slot being engageable under the head of the other stud only as the gate is being closed over said port, the gate being removable from the spout when in open position without preliminary detachment of any parts of the device by pulling it directly away from the first mentioned stud, said first slot and associated stud being the sole means for retaining the gate on said spout during pivotal movement of the gate when the second slot and other stud are disengaged.

2. In combination with a spout having a port and a flat end surface surrounding said port, a pair of spring loaded studs provided with enlarged heads mounted at opposite sides of the port on said flat surface, and a gate having a flat side to cooperate with the flat surface of the spout provided with a slot opening into one end of the gate for insertion under one stud head, and provided with a second slot opening from a side of the gate perpendicular to the axis of the first slot positioned for engaging the second stud head only when the gate is rotated to closed position about the first stud as a pivot, said gate having a handle extending from the end thereof adjacent the second slot, the inner end of the first mentioned slot having an enlarged recess to receive and hold the head of the first mentioned stud during pivotal movement of the gate, the gate being removable from the spout when in open position without preliminary detachment of any parts of the device by pulling it directly away from the first mentioned stud, said first slot and associated stud being the sole means for retaining the gate on said spout during pivotal movement of the gate when the second slot and other stud are disengaged.

3. In combination with a spout having a port, a pair of resiliently mounted studs on said spout positioned at opposite sides of the port and provided with enlarged heads, and a gate having a handle and a pair of spaced apart slots opening to the lateral edges of said gate, one slot being engageable under one stud head to pivotally connect the gate to the spout and the other slot being arranged on an arc of a circle concentric with said pivot for slidably passing under the head of the second stud only as the gate approaches and reaches port closing position, the gate being removable from the spout without preliminary detachment of any other parts merely by rotating it to open position and disengaging the first slot from the pivot stud, said gate being retained on said spout when in open position solely by the pivot stud.

FORREST W. DENNISON.